(12) United States Patent
Gabbianelli et al.

(10) Patent No.: US 6,621,037 B2
(45) Date of Patent: Sep. 16, 2003

(54) WELDING MATERIAL WITH CONDUCTIVE SHEET AND METHOD

(75) Inventors: Gianfranco Gabbianelli, Troy, MI (US); Richard D. Ashley, Berkley, MI (US); Ralph Miller, Sterling Heights, MI (US)

(73) Assignee: Magna International Inc., Aurora (CA)

( * ) Notice: Subject to any disclaimer, the term of this patent is extended or adjusted under 35 U.S.C. 154(b) by 0 days.

(21) Appl. No.: 10/042,385

(22) Filed: Jan. 11, 2002

(65) Prior Publication Data

US 2002/0100747 A1 Aug. 1, 2002

Related U.S. Application Data

(63) Continuation-in-part of application No. 09/518,646, filed on Mar. 3, 2000, now Pat. No. 6,346,684.

(51) Int. Cl.[7] ............................ B23K 9/28; B23K 11/00; B23K 9/00
(52) U.S. Cl. ...................... 219/94; 219/59.1; 219/61.1; 219/61.2; 219/61; 219/117.1
(58) Field of Search ............................ 219/94, 53, 59.1, 219/61.1, 61.2, 61, 117.1, 230

(56) References Cited

U.S. PATENT DOCUMENTS

| | | | |
|---|---|---|---|
| 1,581,931 A | 4/1926 | Lamplugh | |
| 1,846,567 A | 2/1932 | Murray, Jr. | |
| 2,269,451 A | 1/1942 | Ford | 296/28 |
| 2,389,907 A | 11/1945 | Helmuth | 296/28 |
| 2,467,636 A | 4/1949 | Stoudt et al. | 219/4 |
| 2,668,722 A | 2/1954 | Muller | 280/106 |
| 2,787,699 A | 4/1957 | Jessen | |
| 3,122,629 A | 2/1964 | Manz | 219/74 |
| 3,159,419 A | 12/1964 | Kerby | 296/28 |
| 3,630,056 A | 12/1971 | Cuq | 72/28 |
| 3,644,695 A | 2/1972 | Shuey et al. | 219/59.1 |
| 3,718,798 A | 2/1973 | Randolph et al. | 219/125.12 |
| 3,876,852 A | 4/1975 | Topham | 219/137 R |
| 3,971,588 A | 7/1976 | Bauer | 296/28 |

(List continued on next page.)

FOREIGN PATENT DOCUMENTS

| | | | |
|---|---|---|---|
| DE | 867059 | | 1/1953 |
| DE | 4122862 | | 1/1993 |
| DE | 19530835 A | * | 2/1997 |
| EP | 0457400 A1 | | 11/1991 |
| EP | 0570150 A1 | | 11/1993 |
| EP | 0764493 A1 | | 3/1997 |
| FR | 694774 | | 12/1930 |
| JP | 1-95891 A | * | 4/1989 |
| JP | 3-10089 A | * | 1/1991 |
| JP | 2000-17338 A | | 1/2000 |
| WO | WO97/00595 | | 1/1997 |

OTHER PUBLICATIONS

"Lighter Car Body in Aluminum wqith Hydroforming Technology R&D Results," Hanicke et al., IBEC 96, Detroit, Oct. 1–3, 1996, Volvo Car Corporation.

(List continued on next page.)

Primary Examiner—Tom Dunn
Assistant Examiner—L. Edmondson
(74) Attorney, Agent, or Firm—Pillsbury Winthrop LLP (57) ABSTRACT

A welding material assembly is constructed and arranged to position a welding material in electrically conductive relation between exterior surface portions of first and second weldable members at a location where the first and second weldable members are to be joined. The welding material assembly includes at least one welding material member mounted on a flexible carrier sheet in a predetermined arrangement with each welding material member being constructed of an electrically conductive metallic welding material capable of melting when heated by application of an electrical current. Each welding material member is mounted on the sheet such that when the sheet is placed between the exterior surfaces of the first and second weldable members to be welded, each welding material member is electrically conductively disposed therebetween.

18 Claims, 4 Drawing Sheets

U.S. PATENT DOCUMENTS

| | | | |
|---|---|---|---|
| 4,051,704 A | 10/1977 | Kimura ........................ 72/58 |
| 4,141,482 A | * 2/1979 | Reynolds ..................... 228/158 |
| 4,142,085 A | 2/1979 | Knipstrom et al. ........... 219/61 |
| 4,150,274 A | 4/1979 | Minin et al. |
| 4,192,374 A | 3/1980 | Hayden et al. |
| 4,355,844 A | 10/1982 | Muzzarelli ................... 296/205 |
| 4,408,112 A | 10/1983 | Kazlauskas ............. 219/137 R |
| 4,441,006 A | 4/1984 | Machida et al. ............... 219/85 |
| 4,471,519 A | 9/1984 | Capello et al. ................ 29/460 |
| 4,592,577 A | 6/1986 | Ayres et al. |
| 4,611,830 A | 9/1986 | von Ahrens |
| 4,618,163 A | 10/1986 | Hasler et al. ................ 280/785 |
| 4,648,208 A | 3/1987 | Baldamus et al. ............. 49/502 |
| 4,656,328 A | 4/1987 | Weldon et al. ............. 219/59.1 |
| 4,660,345 A | 4/1987 | Browning ..................... 52/648 |
| 4,726,166 A | 2/1988 | DeRees ....................... 52/694 |
| 4,728,760 A | 3/1988 | Brolin et al. ............... 219/617 |
| 4,735,355 A | 4/1988 | Browning ................... 228/189 |
| 4,759,111 A | 7/1988 | Cudini ......................... 29/523 |
| 4,835,356 A | 5/1989 | Abe ............................ 219/119 |
| 4,886,203 A | * 12/1989 | Puzrin et al. .............. 219/59.1 |
| 4,906,313 A | 3/1990 | Hill ........................ 219/137 R |
| 4,906,823 A | * 3/1990 | Kushima et al. ............ 228/245 |
| 4,933,531 A | 6/1990 | Ichikawa et al. ......... 219/86.25 |
| 4,986,597 A | 1/1991 | Clausen ....................... 296/205 |
| 5,031,958 A | 7/1991 | Fujita et al. ................. 296/194 |
| 5,094,313 A | 3/1992 | Mauws ........................ 180/210 |
| 5,106,249 A | 4/1992 | Janotik ......................... 411/43 |
| 5,107,095 A | 4/1992 | Derbyshire |
| 5,170,557 A | 12/1992 | Rigsby ....................... 138/148 |
| 5,209,541 A | 5/1993 | Janotik et al. ................ 296/29 |
| 5,213,386 A | 5/1993 | Janotik et al. ................ 296/29 |
| 5,228,259 A | 7/1993 | Haddad et al. ............. 52/653.2 |
| 5,233,789 A | 8/1993 | Priest et al. ................... 49/360 |
| 5,233,856 A | 8/1993 | Shimanovski et al. .......... 72/62 |
| 5,269,585 A | 12/1993 | Klages et al. ............... 296/205 |
| 5,271,687 A | 12/1993 | Holka et al. ................. 403/233 |
| 5,320,403 A | 6/1994 | Kazyak ....................... 296/203 |
| 5,320,697 A | 6/1994 | Hegler et al. ................ 219/110 |
| 5,332,281 A | 7/1994 | Janotik et al. ............... 296/209 |
| 5,333,775 A | 8/1994 | Bruggemann et al. ...... 228/157 |
| 5,338,080 A | 8/1994 | Janotik et al. ................ 296/29 |
| 5,343,666 A | 9/1994 | Haddad et al. ............. 52/648.1 |
| 5,380,978 A | 1/1995 | Pryor .................... 219/125.12 |
| 5,389,760 A | 2/1995 | Zollinger ..................... 219/53 |
| 5,407,514 A | * 4/1995 | Butts et al. .............. 156/274.2 |
| 5,407,520 A | 4/1995 | Butts et al. ................. 228/155 |
| 5,411,777 A | 5/1995 | Steele et al. ................ 428/34.9 |
| 5,445,001 A | 8/1995 | Snavely |
| 5,458,393 A | 10/1995 | Benedyk ..................... 296/203 |
| 5,460,026 A | 10/1995 | Schafer ......................... 72/55 |
| 5,476,725 A | 12/1995 | Papich et al. |
| 5,481,892 A | 1/1996 | Roper et al. .................... 72/61 |
| 5,518,209 A | 5/1996 | Chicoine et al. ........ 244/158 R |
| 5,549,352 A | 8/1996 | Janotik et al. ............... 296/209 |
| 5,561,902 A | 10/1996 | Jacobs et al. ............. 29/897.2 |
| 5,564,785 A | 10/1996 | Schultz et al. ........... 297/452.2 |
| 5,577,796 A | 11/1996 | Clausen ....................... 296/202 |
| 5,581,947 A | 12/1996 | Kowall et al. ................ 49/451 |
| 5,582,052 A | 12/1996 | Rigsby ......................... 72/62 |
| 5,600,983 A | 2/1997 | Rigsby ......................... 72/61 |
| 5,641,176 A | 6/1997 | Alatalo ....................... 280/690 |
| 5,649,735 A | 7/1997 | Tomforde et al. ............. 296/71 |
| 5,673,929 A | 10/1997 | Alatalo ....................... 280/690 |
| 5,718,048 A | 2/1998 | Horton et al. ............. 29/897.2 |
| 5,720,092 A | 2/1998 | Ni et al. .................... 29/421.1 |
| 5,720,511 A | 2/1998 | Benedyk ..................... 296/203 |
| 5,729,463 A | 3/1998 | Koenig et al. .............. 219/119 |
| 5,765,906 A | 6/1998 | Iwatsuki et al. ............ 296/203 |
| 5,783,794 A | * 7/1998 | Oikawa et al. .............. 219/118 |
| 5,794,398 A | 8/1998 | Kaehler et al. ............ 52/653.2 |
| 5,800,003 A | 9/1998 | Clenet ......................... 296/29 |
| 5,818,008 A | 10/1998 | Cecil .......................... 219/110 |
| 5,829,124 A | * 11/1998 | Kresge et al. ................. 29/840 |
| 5,831,235 A | 11/1998 | Cecil .......................... 219/110 |
| 5,845,382 A | 12/1998 | Schultz et al. ............. 29/421.1 |
| 5,848,853 A | 12/1998 | Clenet ........................ 403/272 |
| 5,953,945 A | 9/1999 | Horton ......................... 72/58 |
| 5,992,897 A | 11/1999 | Hill et al. |
| 6,000,603 A | * 12/1999 | Koskenmaki et al. ....... 228/246 |
| 6,010,155 A | 1/2000 | Rinehart |
| 6,037,556 A | 3/2000 | Rudd ....................... 219/61.2 |
| 6,063,510 A | 5/2000 | Inabayashi et al. |
| 6,068,176 A | 5/2000 | Petrikas ..................... 228/56.3 |
| 6,092,865 A | * 7/2000 | Jaekel et al. ................ 296/205 |
| 6,131,954 A | 10/2000 | Campbell ................ 296/146.5 |
| 6,142,362 A | * 11/2000 | Maus et al. ................. 228/181 |
| 6,209,372 B1 | 4/2001 | Freeman .................. 219/86.25 |
| 6,225,598 B1 | 5/2001 | Nihei et al. ................. 219/137 |
| 6,323,458 B1 | 11/2001 | Nomura et al. |
| 6,346,684 B1 | 2/2002 | Gabbianelli et al. ........ 219/617 |
| 6,405,761 B1 | 6/2002 | Shimizu et al. |

OTHER PUBLICATIONS

International Application No. PCTR/CA 98/00962, PCT Search Report, mailed Jan. 17, 1999, Magna International Inc.

U.S. patent application Publication No. US2001/0000119 A1, Hydroformed Space Frame and Joints Therefor, Jaekel et al., Apr. 5, 2001.

U.S. patent application Publication No. US2001/0019039 A1, Welding Assembly with Nestable Conductive Ends, Gabbianelli et al., Sep. 6, 2001.

* cited by examiner

WELDING MATERIAL WITH CONDUCTIVE SHEET AND METHOD

This application is a continuation-in-part of U.S. patent application Ser. No. 09/518,646, filed Mar. 3, 2000, now U.S. Pat. No. 6,346,684, which is hereby incorporated herein by reference in its entirety.

This application is also related to commonly assigned U.S. patent applications being filed concurrently herewith and titled Apparatus and Method for Welding Aluminum Tubes (PW Matter No. 280427) and Welding Material and Method Without Carrier (PW Matter No. 280426), the entire contents of each being incorporated herein by reference thereto.

FIELD OF THE INVENTION

The present invention is generally related to welding and an illustrated embodiment of the present invention is related to welding tubular members.

BACKGROUND OF THE INVENTION

Welding operations are used in many industrial applications, such as vehicle construction on vehicle assembly lines. To form certain welded connection, a desired amount of the welding material must be placed between the surfaces of the weldable members where the joint is to be formed and then heated. This type of joint is difficult to form when the weldable members are tubular in form because it becomes difficult to directly access the surfaces to be welded.

Tubular hydroforming technology is increasingly being used in industry, particularly in the automotive industry. Hydroforming technology offers many advantages for automobile frame construction, but the use of common welding methods for welding tubular components is difficult and can result in time and cost inefficiencies.

SUMMARY OF THE INVENTION

One object of the present invention is to provide a welding material assembly for positioning a welding material in electrically conductive relation between exterior surface portions of first and second weldable members at a location where the first and second weldable members are to be joined, the welding material assembly comprising: at least one welding material member mounted on a flexible carrier sheet in a predetermined arrangement, each welding material member being constructed of an electrically conductive metallic welding material capable of melting when heated by application of an electrical current, the carrier sheet being constructed of a material that is electrically conductive and each welding material member being mounted on the sheet such that when the sheet is placed between the exterior surfaces of the first and second weldable members to be welded each welding material member and the sheet are electrically conductively disposed between the first and second weldable members.

Another object of the present invention is to provide a welding material assembly for positioning a welding material in electrically conductive relation between exterior surface portions of first and second weldable members at a location where the first and second weldable members are to be joined, the welding material assembly comprising: a flexible carrier sheet; and a plurality of welding material members mounted on the sheet in a predetermined arrangement, each of the plurality of welding material members being constructed of an electrically conductive metallic welding material capable of melting when heated by application of an electrical current, and each of the plurality of welding material members being mounted on the sheet such that when the sheet is placed between the exterior surfaces of the first and second weldable members to be welded each of the plurality of welding material members is electrically conductively disposed between the first and second weldable members.

Another object of the invention is to provide a rolled welding material strip assembly, comprising: a plurality of welding material assemblies, each of the plurality of welding material assemblies being constructed and arranged to position welding material in electrically conductive relation between exterior surface portions of first and second weldable members at a location where the first and second weldable members are to be joined together, each of the plurality of welding material assemblies comprising at least one welding material member mounted on a flexible carrier sheet, each of the at least one welding material member being constructed of an electrically conductive metallic welding material capable of melting when heated by application of an electrical current and being mounted on the sheet such that when the sheet is placed between the exterior surfaces of the first and second weldable members to be welded, each of the at least one welding material members is electrically conductively disposed between the first and second weldable members, each of the plurality of welding material assemblies being removably secured to one another.

Another object of the invention is to provide a method of welding tubular members, comprising: providing first and second tubular members, each of the first and second tubular members having a respective exterior surface; providing at least one welding material member carried in a predetermined arrangement by a flexible carrier sheet, each of the at least one welding material members being constructed of an electrically conductive metallic welding material capable of bonding in weld-forming relation with the first and second tubular members; positioning the carrier sheet between the first and second tubular members so that each of the at least one welding material member is disposed in current transmitting relation between the respective exterior surfaces of the first and second tubular members; and applying an electrical current across the first and second tubular members such that the applied current flows through the respective exterior surfaces of the first and second tubular members and each of the at least one welding material members disposed between the first and second tubular members to weld the respective exterior surfaces of the first and second tubular members together.

Other objects, features, and advantages of the present invention will become apparent from the following detailed description, the accompanying drawings, and the appended claims.

DETAILED DESCRIPTION OF THE INVENTION

Figure 1:
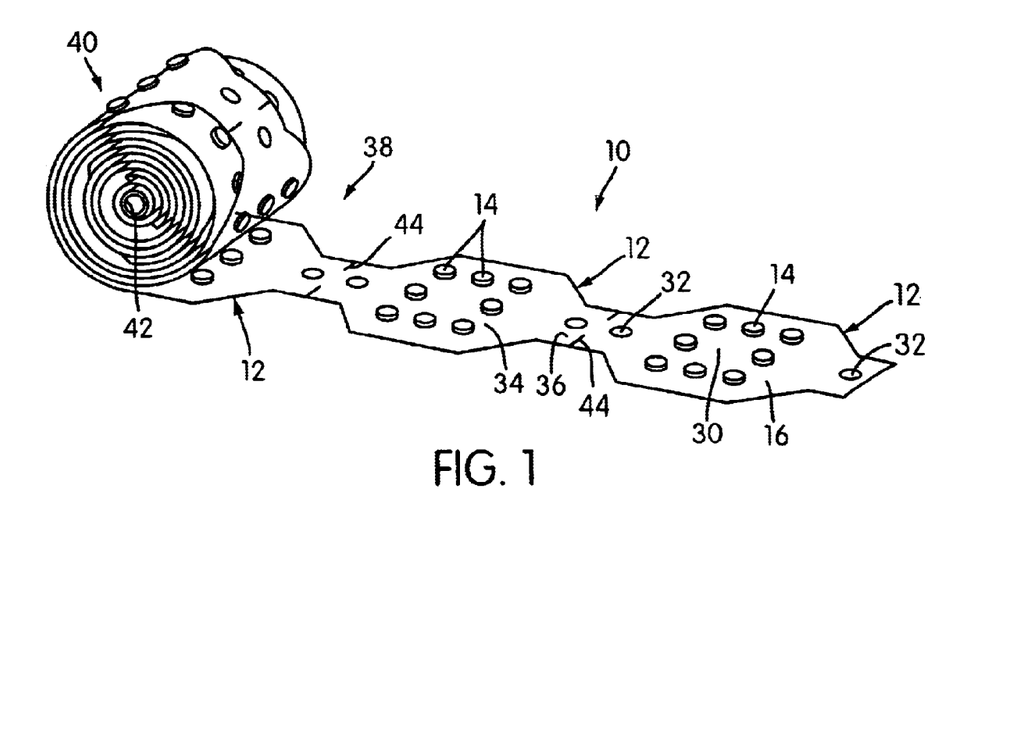
FIG. 1 is a perspective view of a welding material strip assembly constructed according to the principles of the illustrated embodiment of the present invention.
Figure 1A:
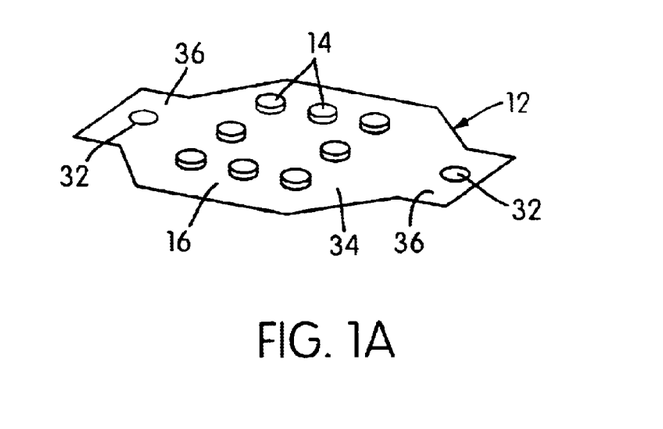
FIG. 1a is a single welding material strip removed from the assembly of FIG. 1.
Figure 2:
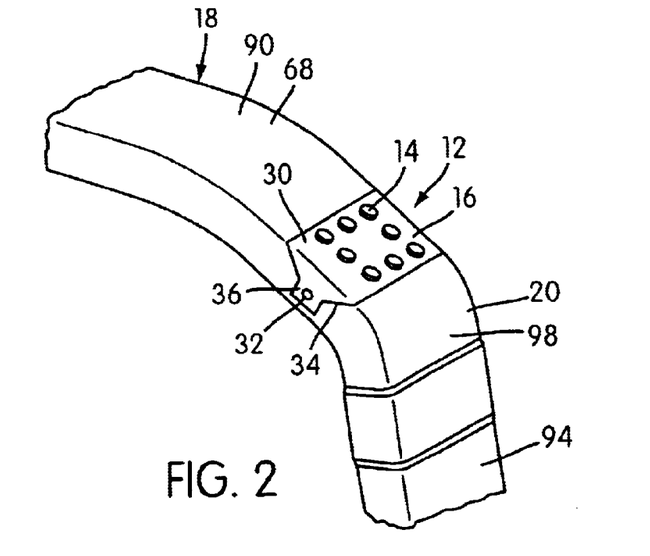
FIG. 2 is a perspective view of a welding material assembly constructed according to the principles of the present invention mounted on a first weldable member.
Figure 2A:
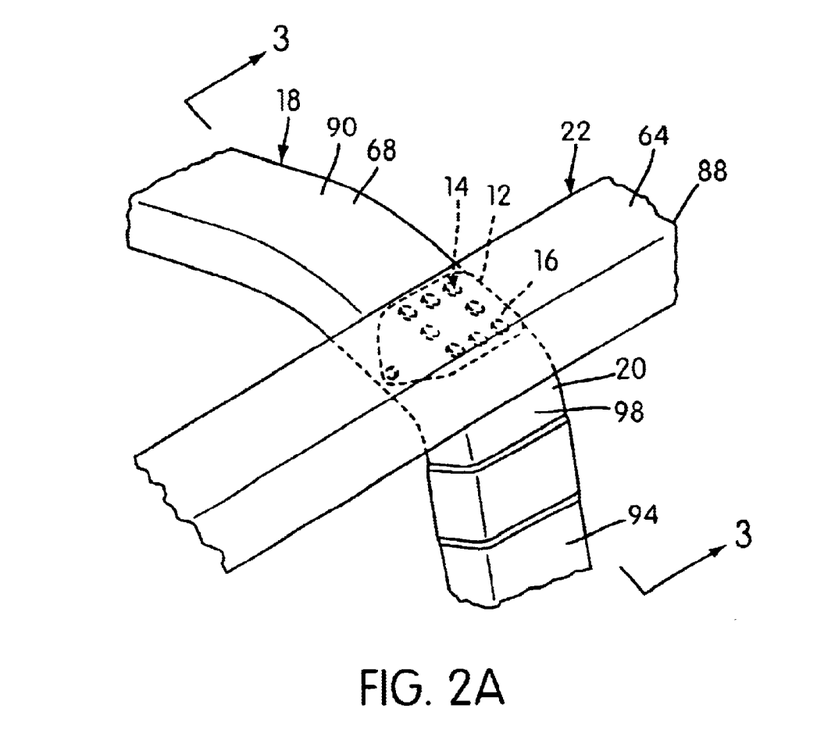
FIG. 2a is a perspective view similar to FIG. 2 but showing a second weldable member positioned on the first weldable member.
Figure 5:
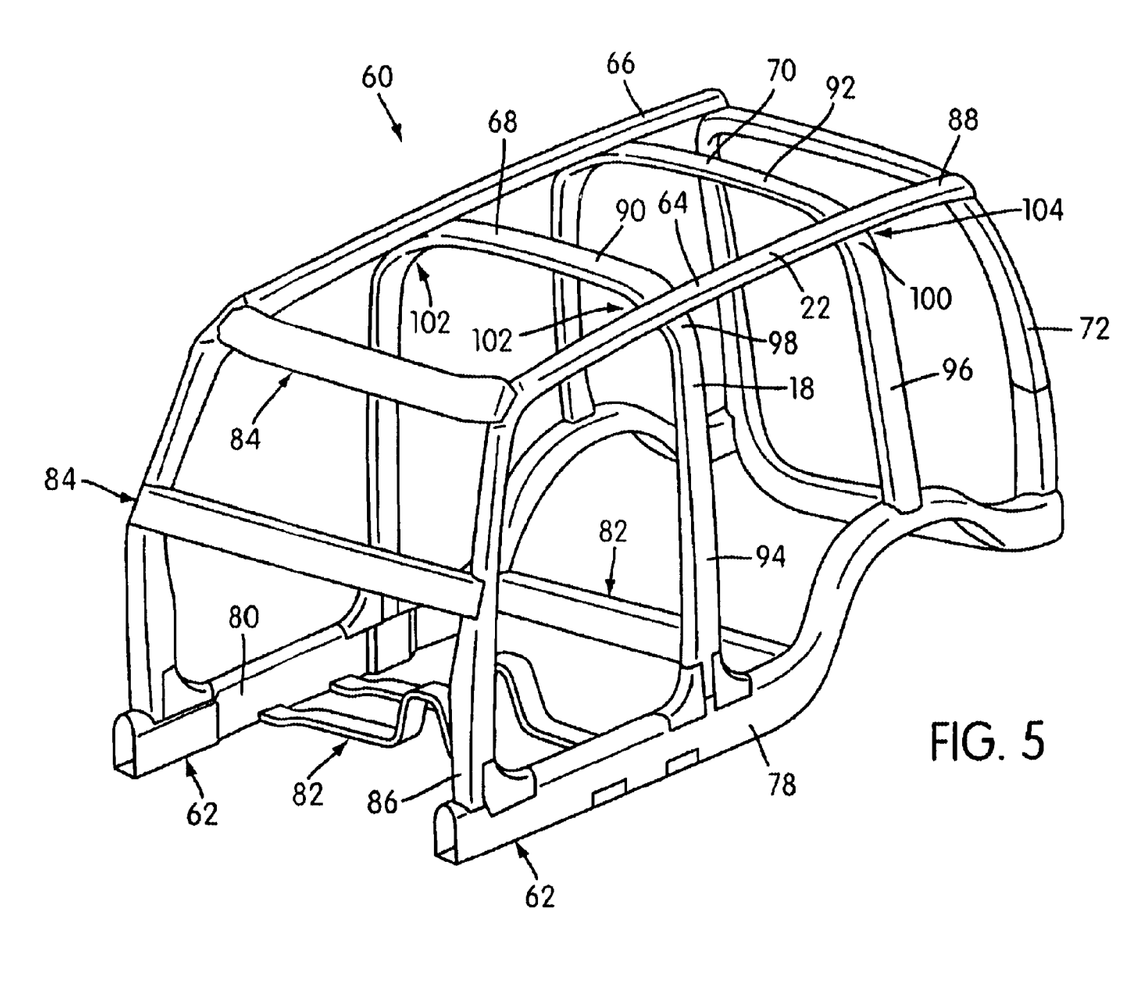
FIG. 5 shows a perspective view of a space frame for a motor vehicle that includes joints formed according to a method of the present invention.

FIG. 1 shows a welding material strip assembly, generally designated 10, that is made up of a plurality of welding material assemblies 12 removably joined together to form a rollable continuous strip. Each welding material assembly 12 includes at least one welding material member 14 mounted on a flexible carrier sheet 16 in a predetermined arrangement. As will become apparent, a carrier sheet 16 can be removed from the strip assembly 10, as seen in FIG. 1a, and placed between two surfaces of weldable members 18 and 22, as seen in FIGS. 2 and 2a, where a welded connection is to be formed to thereby position the welding material members 14 carried by the carrier sheet 16 between the surfaces of the weldable members 18 and 22. Assembly 10 can be used to form welds between weldable members 18 and 22 such as those used in a vehicle space frame 60 as seen in FIG. 5.

More particularly, each welding material assembly 12 is constructed and arranged to position welding material 14 in electrically conductive relation between the exterior surface portions 20 and 24 of first and second weldable members 18 and 22 at a location where the first and second weldable members 18 and 22 are to be joined. Each welding material member 14 is preferably constructed of an electrically conductive metallic welding material capable of melting when heated by application of an electrical current. Each flexible carrier sheet 16 is preferably constructed of a flexible material that can appropriately hold the welding material members 14. The carrier sheet 16 can be electrically nonconductive or electrically conductive, and each welding material member 14 is mounted on or in the carrier sheet 16 such that when the carrier sheet 16 is placed between exterior surfaces 20 and 24 of first and second weldable members 18 and 22 to be welded, each welding material member 14 is electrically conductively disposed therebetween. In the illustrated embodiment, the carrier sheet 16 is formed of electrically conductive material, such as metal. In particular, the carrier sheet 16 can be formed of thin sheets of metal such as stainless steel or carbon steel.

The welded connection is formed by positioning at least one welding material member 14 constructed of a metallic welding material that is different from the metallic material used to construct each of the weldable members 18, 22 between the exterior surfaces 20, 24 to be joined. As best seen in FIGS. 1 and 1a, preferably a plurality of welding material members 14 are mounted on each carrier sheet 16 (although only one is required) for positioning between the surfaces 20, 24 to be joined (i.e., welded together) and preferably these welding material members 14 are arranged in a predetermined manner on each carrier sheet 16 to position the welding material members 14 to maximize joint strength and optimize joint formation. In the exemplary embodiment of the welding material assembly 12 shown in FIGS. 1–3, each welding material member 14 is a thin, small diameter disk-shaped member, but it can be understood that a wide range of welding material member shapes and sizes are contemplated.

Figure 4:
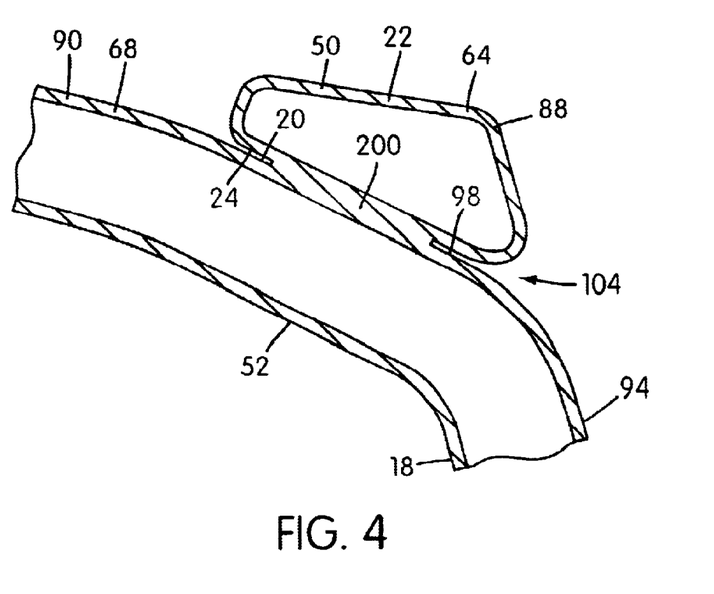
FIG. 4 is a view similar to FIG. 3 except showing the first and second weldable members after joint formation.

The size and shape selected for each of the welding material members 14 will depend on many factors including the materials used to construct the weldable members 18 and 22, the material used to construct the welding material members 18 and 22 and the size and shape of the joint area between the two weldable members 18 and 22 (i.e., the size and shape of the overlapping surface areas of the two weldable members). Each welding material member 14 is shown being a circular disc, but can have any desired shape. As mentioned, it is contemplated to provide welding material assemblies 12 in which a single welding material member 14 is mounted on each carrier sheet 16. A range of broad, thin shapes (e.g., a large X-shape) of the welding material member 14 is contemplated for instances in which only one welding material member 14 is mounted on each sheet 16. Preferably a plurality of welding material members 14, each being in the form of a small thin disk is mounted on each carrier sheet 16. The thin, small diameter disk shape readily permits discreet localized areas of electric current flow between the weldable members 18, 22, which facilitates melting of the members 14. Also, if the carrier sheet 16 is conductive, it aids in melting the carrier sheet 16. As seen in FIG. 4, when the carrier sheet 16 is conductive and melts along with the welding material members 14, a uniform weld 200 can be formed.

A preferred welding material for the welding material members 14 is stainless steel in the instance in which the weldable members 18, 22 are constructed of a mild steel, which is also preferred. It is contemplated, however, to use a wide range of metallic welding materials to construct the welding material assemblies 12 and to use the assemblies 12 to form welded connections between weldable members 18 and 22 that are constructed of other materials, such as aluminum.

The welding material used to construct each welding material member 14, and carrier sheet 16 if it is formed of conductive material, should be more resistive (i.e., have a greater resistance to the flow of electrical current) and have a lower melting point than the metallic material used to construct each weldable member 18, 22.

The carrier sheets 16 allow the welding material members 14 to be easily handled and to be held in a predetermined configuration between the surfaces 20, 24 to be welded together before the weld 200 is formed. Preferably a central portion 30 of each carrier sheet 16 has a size and shape that corresponds to the area of the overlap between the overlying exterior adjacent surfaces 20, 24 to be bonded and preferably the welding material members 14 are of a predetermined size and shape and are arranged in a predetermined pattern to assure optimal bonding between the weldable members 18, 22.

If formed as a nonconductive carrier, each carrier sheet can be constructed of an electrically nonconductive paper or plastic material that disintegrates during the welding process to an extent sufficient to permit the welding material members 14 to expand in diameter when melted during welding. In the preferred embodiment illustrated herein, carrier sheet 16 is formed of a conductive material. The carrier sheet 16 can be a metal material, such as stainless steel or carbon steel. When the carrier sheet 16 is a conductive material, the carrier sheet 16 can melt with the welding material members 14, which will allow both the welding material members 14 and the carrier sheet 16 to expand during welding and create a substantially continuous layer of welding material and carrier sheet material between the weldable members 18 and 22 creating a substantially continuous and strong weld 200.

The carrier sheet 16 should be thinner than the welding material members 14 so that the carrier sheet 16 does not interfere with the forces applied during welding as will be described. The welding material members 14 can be mounted to the carrier sheet 16 in any appropriate manner and/or by any appropriate mechanism. One preferred manner of attaching welding material members 14 is by forcing the welding material members 14 into pre-formed holes in the carrier sheet 16, so that the welding material members 14 become wedged in the preformed holes. That is, the welding material members 14 can be connected to the carrier sheet by a "snap-fit." Also, welding material members 14 can be attached by an adhesive. If the carrier sheet 16 is formed from conductive materials, additional examples of connections between the carrier sheet 16 and the welding material members 14 are a conductive adhesive, soldering, brazing, spot welding, or projection welding.

Preferably the carrier sheet 16 further includes a plurality of securing weldable material members 32 constructed and arranged to affix the carrier sheet 16 to a surface of one of the weldable members such as surface 20 of a metallic member 18 at a location thereon where a welded connection is to be formed. The securing weldable material members 32 hold the carrier sheet 16 in place while the second weldable member is place in overlying relation thereto. The carrier sheet 16 can be mounted to the surface 20 of metallic member 18 by conductive adhesive, soldering, brazing, spot welding, or projection welding at the securing weldable material members 32. In the exemplary embodiment of the welding material assembly 12 shown, for example, in FIGS. 1–2, the carrier sheet 16 has a pair of tapered portions 34 on each side of the central portion 30 that terminate in narrow end portions 36. A securing weldable material member 32 is provided on each end portion 36 to enable the assembly 12 to be welded to the sides of one of the members 18 and 22 prior to resistance welding. Alternatively, the members 32 can be adhesive members such as a two-faced tape or any other appropriate structure that can hold the carrier sheet 16 to one member 18 or 22 while the other member 18 or 22 is placed in overlying relation.

Although carrier sheets 16 can be used as individual stand-alone sheets, as mentioned above and as shown in FIG. 1, the individual weld carrier sheets 16 can be removably attached end-to-end to form the welding material strip assembly 10. Because the carrier sheets 16 are thin and flexible, the welding material strip assembly 10 can be easily wound into a roll 40. The exemplary strip assembly 10 is shown in FIG. 1 wound around a spindle 42 for easy storage, shipping and handling. The carrier sheets 16 are preferably manufactured as a continuous strip of material that is perforated at boundaries between adjacent end portions 36 by a series of small aligned slits 44, although a wide range of manufacturing methods and structures for removably securing the sheets 16 together is contemplated.

Figure 3:
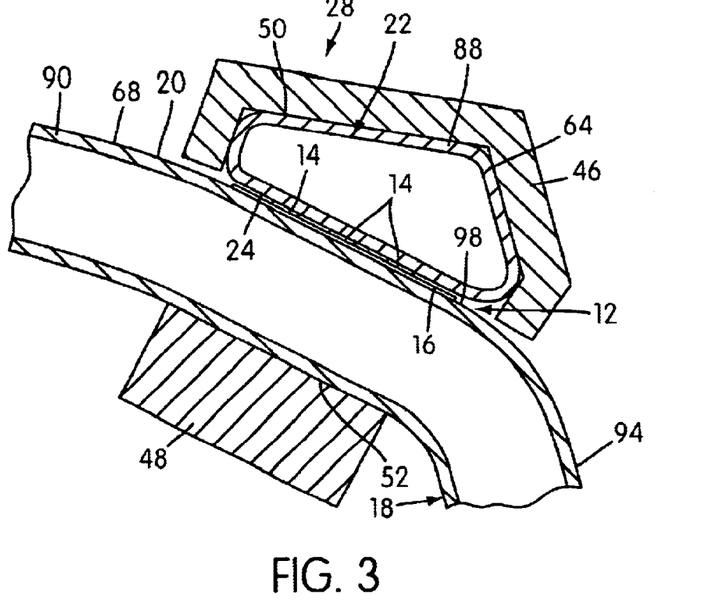
FIG. 3 is a sectional view taken along line 3—3 of FIG. 2a and showing the welding material assembly disposed between the first weldable member and a second weldable member prior to joint formation and showing a schematically represented resistance welding apparatus engaged with the weldable members.

The details of the construction and use of the welding material assemblies 12 can be understood from FIGS. 2–4. FIG. 2 shows an individual welding material assembly 12 mounted on an exterior surface portion 20 of first weldable member in the form of a first tubular hydroformed member 18. FIG. 2a shows second weldable member 22 in the form of a second tubular hydroformed member 22 disposed in overlying relation to the first weldable member 18 with the welding material assembly 12 disposed therebetween. The first and second members 18, 22 in FIGS. 2–4 are intended to be a generic representation of two members that can be welded together using a welding material assembly 12 in a manner described below. Although members 18 and 22 can be hydroformed tubes, the tubular members 18 and 22 illustrated herein can be formed by any appropriate method. Additionally, although the members 18 and 22 are illustrated as being tubular, with closed cross-sections, other shapes and configurations of members 18 and 22 are permissible including tubular configurations with open cross-sections and non-tubular configurations. As will become apparent, the exemplary first and second members 18, 22 used to illustrate the welding process are portions of individual hydroformed members that are joined together to form part of a space frame as shown in FIG. 5. A modified resistance weld apparatus generally designated 28 is shown schematically in FIG. 3 engaged with the weldable members 18, 22. FIG. 4 shows the first and second weldable members 18, 22 after joint formation.

The welding process illustrated in FIG. 3 is a derivative of resistance welding and utilizes transient liquid phase bonding and resistance heating. The welding material assembly 14 can be used, for example, to join together two tubular members 18, 22. The welding material assembly 14 and a preferred method of using the same provide a way for individual hollow sections of the pair of members 18, 22 to be welded together in adjoining relation without direct access to the welding surfaces 20, 24, respectively, of the weldable members 18, 22 while the welded connection (or joint) is being formed.

To form a joint in accordance with the method of the invention, one carrier sheet 16 is removed from the welding material strip assembly 10 to separate one welding material assembly 12 from the continuous strip, which can be formed as roll 40. The single welding material assembly 12 is placed on the exterior surface portion 20 of the first hydroformed member 18 (FIG. 2) in the location where the joint is to be formed and is held there by the securing weldable material members 32. The second hydroformed member 22 is placed in overlying relation to the sheet 16 (FIGS. 2a and 3) so that the exterior surface 24 is in contact with the welding material members 14.

An appropriate welding apparatus, such as a modified resistance weld gun apparatus 28 (or a modified spot welding gun) is used to apply an electrical current and an axial force (i.e., a force perpendicular to the two exterior surfaces 20, 24 in the weldable members 18, 22) across the two members 18, 22 and across the welding material members 14 and carrier sheet 16 during joint formation. More particularly, the apparatus 28 includes a pair of current conducting members 46, 48 (that supply an electrical current from a current source to form the weld) that are applied to exterior surfaces 50, 52, respectively, of the two hydroformed members 18, 22 to be joined in the area where the weld connection or joint therebetween is to be formed. The weld gun apparatus 28 can be controlled manually or robotically. An appropriate apparatus and method for welding members 18 and 22 is disclosed in commonly assigned U.S. patent application Ser. No. 09/754,114 for a Welding Assembly with Nestable Conductive Ends, filed on Jan. 5, 2001, the entire contents of which are hereby incorporated herein by reference thereto.

The conductive members 46, 48 cause a current to flow through the surfaces 20, 24 to be bonded (i.e., joined) and through the welding material members 14. When the material of the carrier sheet 16 is electrically conductive, the carrier sheet 16, melts with the corresponding welding material members 14 and is incorporated into each weld connection (that is, while a current is being supplied by the apparatus 28). The welding material members 14 and carrier sheet 16 are more resistive and have a lower melting point than the base joint metallic material used to construct the members 18, 22. The material properties of the contiguous members 14, 16, 18, 22 combine to create preferential heating and subsequent localized melting of the welding material members 14 and carrier sheet 16 prior to the melting of the hollow section material of the members 18, 22. The welding material members 14 and carrier sheet 16 liquefy during the welding process.

The energy required to liquefy the welding material members 14 and carrier sheet 16 is generated by the applied electrical current. The welding material members 14 and carrier sheet 16 heat up preferentially and cause melting of the welding material members 14 and carrier sheet 16 and then localized melting of the adjacent metallic material of the hydroformed members 18, 22. The melted material of the welding material members 14 and carrier sheet 16 bonds with the basic metallic material of the members 18, 22 under the axial pressure applied by the conductive members 46, 48. After the aforementioned melting occurs, the current that flows through the surfaces 20, 24 is switched off. The axial force is preferably removed a predetermined amount of time thereafter.

The resulting welded connection 200 is represented in FIG. 4. The carrier sheet 16 has melted along with the welding material members 14 in FIG. 4. The combining of the metallic materials of the metal members 14, 16, 18, 22 is indicated in the cross sectional view of FIG. 4. It can be appreciated that this representation of the welded area 200 is enlarged and exaggerated to more clearly illustrate the welded connection and to indicate the mixing of the metallic materials in the areas where the weld is formed.

Preferably the current is applied through the first and second weldable members 18, 22 and across the welding material members 14 and carrier sheet 16 so as to melt the welding material members 14 and carrier sheet 16 and thereafter to melt portions of the first and second weldable members 18, 22 in areas thereof that are adjacent to the welding material members 14 and carrier sheet 16 and preferably the forces are applied so as to move the first and second exterior surface portions 20, 24 toward one another.

Preferably, each of the exterior surfaces 20, 24 is planar, although they may be of any configuration that is adapted for joint formation. For example, the surfaces can have complimentary convex/concave configurations and the like.

It can be understood that the welding material assemblies 12 and methods for using the same are particularly well suited for forming joints between individual members 18 and 22. While the welding material strip assembly 12 provides particular advantages in welding tubular hydroformed weldable members 18 and 22, it is contemplated that it may also have application in welding other weldable members that have not been hydroformed, but which nevertheless inhibit access to the surfaces to be welded.

As seen in FIG. 5, it is contemplated to use the welding material assemblies 12 and methods of present invention to form joints between the individual members used to construct a space frame 60 for a motor vehicle. An example of a method for using a welding material assembly 12 for forming a space frame 60 and its joints is generally described below. The example is described with reference to an exemplary embodiment of a space frame 60 for a sports utility vehicle shown in FIG. 5. Other examples of space frame joints that are particularly well suited for use with the present welding material assemblies and with methods utilizing the assemblies are disclosed in commonly assigned U.S. Pat. No. 6,092,865 and entitled HYDROFORMED SPACE FRAME AND METHOD OF MANUFACTURING THE SAME, which is hereby incorporated by reference thereto in its entirety into the subject application.

FIG. 5 shows a perspective view of a motor vehicle space frame 60. The space frame 60 includes a pair of longitudinally extending, laterally spaced side rail structures 62, a pair of hydroformed upper longitudinal members 64, 66, a pair of hydroformed U-shaped cross members 68, 70 and a rearward ring assembly 72. Preferably the side rail structures 62 are provided by a pair of hydroformed members 78, 80 of mirror image construction. A plurality of laterally extending cross structures generally designated 82 are connected between the side rail structures 62 and a pair of laterally extending upper cross structures 84 are connected between the pair of upper longitudinal members 64, 66.

Each hydroformed upper longitudinal member 64, 66 includes a pillar forming portion 86 and a longitudinally extending portion 88. Each upper longitudinal member 64, 66 is connected to an associated side rail structure 62 and extends upwardly therefrom to form an A pillar of the space frame 60. Each hydroformed cross member 68, 70 includes a cross portion 90, 92, respectively, and a pair of leg portions 94, 96, respectively, extending from junctures 98, 100 at opposite ends of the associated cross portion. Each leg portion of the cross member is connected to a respective side rail structure 62 and extends upwardly therefrom to provide an intermediate pillar thereon (i.e., the B pillars and C pillars). The longitudinally extending portion 88 of each upper longitudinal member 64, 66 is connected to the juncture 98, 100 of the associated cross member 68, 70 to form a joint 102, 104, respectively. While the members 18 and 22 join to form a single joint 102 in space frame 60 as illustrated in FIG. 5, it should be understood that the methods and apparatus to join members 18 and 22 can be used for any of the numerous joints of space frame 60 and as illustrated in FIG. 5.

While the invention has been disclosed and described with reference with a limited number of embodiments, it will be apparent that variations and modifications may be made thereto without departure from the spirit and scope of the invention. Therefore, the following claims are intended to cover modifications, variations, and equivalents thereof in accordance with the principles and advantages noted herein.

What is claimed is:

1. A welding material assembly for positioning a welding material in electrically conductive relation between exterior surface portions of first and second weldable members at a location where the first and second weldable members are to be joined, the welding material assembly comprising:

at least one welding material member mounted on a flexible carrier sheet in a predetermined arrangement, each said welding material member being constructed of an electrically conductive metallic welding material capable of melting when heated by application of an electrical current, said carrier sheet being constructed of a material that is electrically conductive and each said welding material member being mounted on said sheet such that when said sheet is placed between the exterior surfaces of the first and second weldable members to be welded each said welding material member and said sheet are electrically conductively disposed between the first and second weldable members, wherein each said welding material member is constructed of steel.

2. A welding material assembly as defined in claim 1 wherein each carrier sheet is constructed of metal.

3. A welding material assembly as defined in claim 1 wherein said at least one welding material member includes a plurality of welding material members in a predetermined arrangement.

4. A welding material assembly for positioning a welding material electrically conductive relation between exterior surface portions of first and second weldable members at a location where the first and second weldable members are to be joined, the welding material assembly comprising:

a flexible carrier sheet; and a plurality of welding material members mounted on said sheet in a predetermined arrangement, each of said plurality of welding material members being constructed of an electrically conductive metallic welding material capable of melting when heated by application of an electrical current, and each of said plurality of welding material members being mounted on said sheet such that when said sheet is placed between the exterior surfaces of the first and second weldable members to be welded each of said plurality of welding material members is electrically conductively disposed between the first and second weldable members, wherein each of said plurality of welding material members is constructed of steel.

5. A welding material assembly as defined in claim 4 wherein said sheet is constructed of an electrically conductive material.

6. A welding material assembly as defined in claim 5 wherein said sheet is constructed of steel.

7. A rolled welding material strip assembly, comprising:

a plurality of welding material assemblies, each of said plurality of welding material assemblies being constructed and arranged to position welding material in electrically conductive relation between exterior surface portions of first and second weldable members at a location where the first and second weldable members are to be joined together, each of said plurality of welding material assemblies comprising at least one welding material member mounted on a flexible carrier sheet, each of said at least one welding material member being constructed of an electrically conductive metallic welding material capable of melting when heated by application of an electrical current and being mounted on said sheet such that when said sheet is placed between the exterior surfaces of the first and second weldable members to be welded, each of said at least one welding material member is electrically conductively disposed between the first and second weldable members, each of said plurality of welding material assemblies being removably secured to one another.

8. A welding material strip assembly as defined in claim 7 wherein said plurality of welding material assemblies form a rolled continuous strip of said sheets that are removably secured to one another.

9. A welding material strip assembly as defined in claim 7 wherein each of said at least one welding material member is constructed of steel.

10. A welding material strip assembly as defined in claim 7 wherein each said sheet is constructed of an electrically conductive material.

11. A welding material strip assembly as defined in claim 7 wherein each said sheet is constructed of metal.

12. A welding material assembly according to claim 7 wherein each of said at least one welding material member includes a plurality of welding material in a predetermined arrangement.

13. A method of welding tubular members, comprising:

providing first and second tubular members, each of the first and second tubular members having a respective exterior surface;

providing at least one welding material member carried in a predetermined arrangement by a flexible carrier sheet, each of the at least one welding material member being constructed of an electrically conductive metallic welding material capable of bonding in weld-forming relation with the first and second tubular members;

positioning the carrier sheet between the first and second tubular members so that each of the at least one welding material member is disposed in current transmitting relation between the respective exterior surfaces of the first and second tubular members; and applying an electrical current across the first and second tubular members such that the applied current flows through the respective exterior surfaces of the first and second tubular members and each of the at least one welding material member disposed between the first and second tubular members to weld the respective exterior surfaces of the first and second tubular members together.

14. A method according to claim 13, wherein before providing at least one welding material member carried by a flexible carrier sheet, the carrier sheet is disconnected from another flexible carrier sheet having at least one welding material member.

15. A welding material assembly as defined in claim 1, wherein said at least one welding material includes nuggets that protrude from said carrier sheet with air gaps existing between each of said nuggets.

16. A welding material assembly as defined in claim 4, wherein said plurality of welding material members are nuggets that protrude from said carrier sheet with air gaps existing between each of said nuggets.

17. An assembly as defined in claim 7, wherein said at least one welding material includes nuggets that protrude from said carrier sheet, with air gaps existing between each of said nuggets.

18. A method as defined in claim 13, wherein the providing at least one welding material member includes providing nuggets that are carried by the carrier sheet and that protrude from the carrier sheet, with air gaps existing between each of the nuggets.

* * * * *